Oct. 6, 1931.  M. H. JOHANSON  1,825,733
GEAR CUTTER AND METHOD OF EMPLOYING SAME
Filed June 13, 1929   2 Sheets-Sheet 1
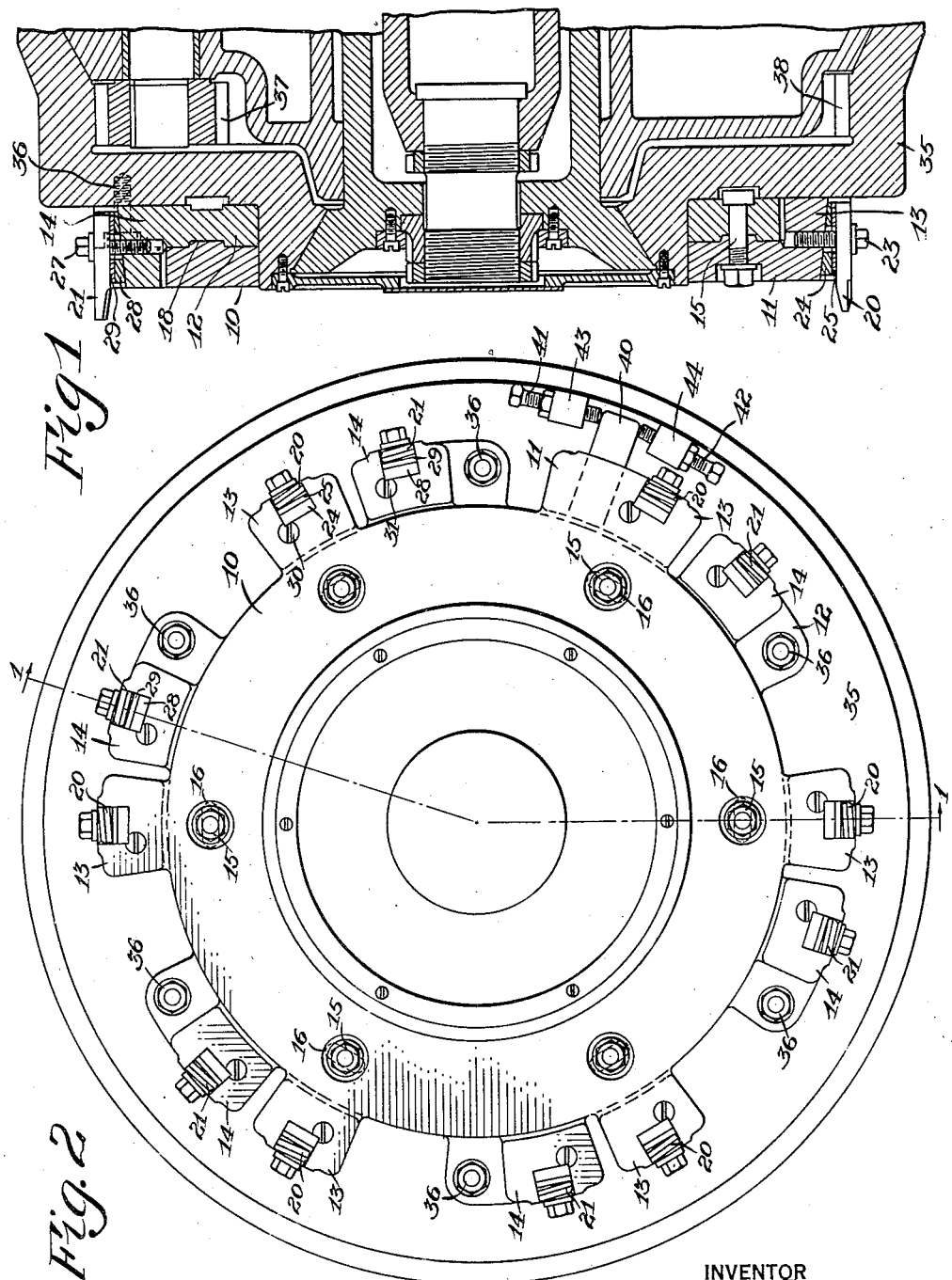
INVENTOR
Magnus H. Johanson
BY
B. Schlesinger
his ATTORNEY Oct. 6, 1931.  M. H. JOHANSON  1,825,733
GEAR CUTTER AND METHOD OF EMPLOYING SAME
Filed June 13, 1929   2 Sheets-Sheet 2

INVENTOR
Magnus H. Johanson
BY
his ATTORNEY

Patented Oct. 6, 1931

1,825,733

UNITED STATES PATENT OFFICE

MAGNUS H. JOHANSON, OF ROCHESTER, NEW YORK, ASSIGNOR TO GLEASON WORKS, OF ROCHESTER, NEW YORK, A CORPORATION OF NEW YORK

GEAR CUTTER AND METHOD OF EMPLOYING SAME

Application filed June 13, 1929. Serial No. 370,616.

The present invention relates to the cutting of longitudinally curved tooth gears, such as spiral bevel and hypoid gears, in a continuous indexing process and to cutters for the cutting of such gears in such a process.

One purpose of the invention is to reduce the number of cutters required to cover a given range of gears where gears are to cut in a continuous indexing process with a face mill cutter.

A further object of this invention is to provide a simple means and method for securing any desired lengthwise tooth curvature on face mill hobbed gears of a given tooth and tooth-space width. This feature is of particular importance in that it enables the mating gears of a pair to be cut so as to secure any desired lengthwise tooth bearing.

Other objects of the invention will be apparent hereinafter from the specification and from the recital of the appended claims.

In the drawings:

Figure 1 is a sectional view taken on the line 1—1 of Figure 2, showing a face mill cutter constructed according to one embodiment of this invention;

Figure 2 is a side elevation of this cutter;

Figure 4:
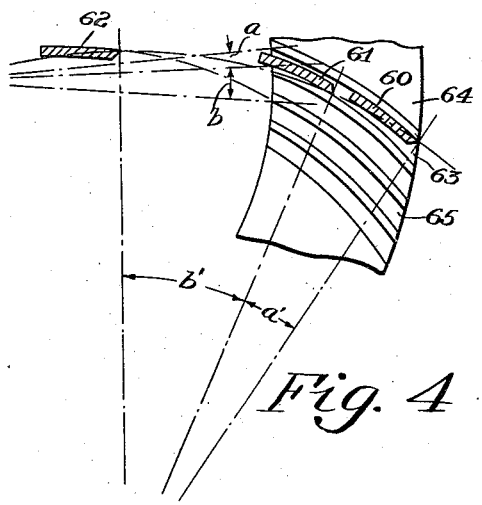
Figure 4 is a diagrammatic view on an enlarged scale illustrating further the relation of tool and blank with the cutting blades in one position of their circumferential adjustment about the axis of the cutter head.

In a face mill cutter for cutting longitudinally curved tooth gears in a continuous indexing process, successive cutting blades or successive groups of cutting blades cut successively different tooth faces or different pairs of tooth faces of the gear blank. The tool and blank rotate continuously in timed relation and so the blank is indexed automatically because of its continuous rotation between passages of successive blades or successive groups of blades across its face. With the present invention, a cutter is employed in which the cutting blades are arranged in pairs around the cutter head, the two blades of each pair cutting opposite side faces of the gear teeth, and the blades for cutting one side of the teeth are adjustable about the axis of the cutter head relative to the blades for cutting the other side of the gear teeth. In this way, the distance between the two blades of a pair and between successive pairs of blades can be adjusted at will.

By means of the present invention, therefore, it is possible to use the same cutter to cut different gears having teeth of different widths by simply adjusting the outside cutting blades circumferentially of the cutter head relative to the inside cutting blades. By the provision of a radial adjustment for the blades in addition to the circumferential adjustment, it is possible, also, to use one cutter to cut gears of different lengthwise curvature but of the same tooth and tooth-space width and to cut gear pairs in which the teeth of the mating gears will have different lengthwise tooth curvature so that they will mesh with any desired amount of lengthwise tooth bearing. The radial adjustment of the cutting blades permits of changing the lengthwise tooth curvature while the circumferential adjustment of the inside blades relative to the outside blades permits of maintaining the desired tooth and tooth-space width despite the change in lengthwise tooth curvature.

In the preferred embodiment of this invention, the cutter head is made in two parts, the outside cutting blades being mounted on one part and the inside cutting blades being mounted on the other and the two parts are adjustable relative to each other about the axis of the cutter head. The pairs of cutting blades may be arranged so as to cut either successively in different tooth spaces of the gear blank or successively different teeth of the blank.

A cutter constructed according to the present invention operates according to the principles disclosed with reference to the cutter of U. S. Patent No. 1,249,378 issued to James E. Gleason et al., December 11, 1917, and the cutter of the present invention may be considered as an improvement over the specific form of cutter disclosed in that patent.

For a more complete understanding of the present invention, reference may now be had to the accompanying drawings. 10 designates generally the cutter head. It is made in two parts, one part being indicated at 11 and the other at 12. The upper part 11 is provided at spaced intervals around its periphery with integral blade supporting members or lugs 13, while the lower part 12 is provided at spaced intervals around its periphery with blade supporting members or lugs 14. When the two parts are assembled together to form the complete cutter head, the blade supporting members or lugs 13 and 14 will alternate with each other around the periphery of the head. The two parts 11 and 12 are adapted to be adjustably secured together to form the complete head by bolts 15 which are secured in the lower part 12 of the head and pass through arcuate slots 16 formed in the upper part 11 concentric of the axis of the cutter head. The lower part 12 is formed with an annular groove and the upper part 11 with an annular tongue 18 which engages in the annular groove formed in the lower part 12 and serves to guide the upper part 11 in its adjustment on the lower part 12.

Each of the blade supporting members 13 of the part 11 carries a cutting blade 20 and each of the supporting members 14 of the lower part 12 carries a cutting blade 21. The cutting portion of each blade projects beyond the cutter head in a direction generally parallel to the axis of the cutter head. The cutting blades 20 will be formed and arranged to cut one side face of the teeth of the gear blank while the cutting blades 21 will be arranged and formed to cut the other side face of the gear teeth. The blades 20 and 21 may be constructed as are the blades in Patent No. 1,249,378 above referred to or may have any other usual or suitable construction compatible with their function of operating successively upon different tooth faces of the gear blank in the cutting operation.

The blades 20 are secured to the part 11 of the cutter head by screws 23 and may be adjusted on the part 11 radially of the axis of the cutter head by wedges 24 and shims 25. The blades 21 are secured to the part 12 of the cutter head in a similar manner being clamped in position by screws 27 and being adjustable radially of the axis of the cutter head by wedges 28 and shims 29. The adjustment of the wedges 24 may be effected by screws 30 which thread into the lugs 13 and have their heads in engagement with the wedges 24. The adjustment of the wedges 28 may be effected by screws 31 which thread into the lugs 14 and have their heads in engagement with the wedges 28.

The cutter head shown is secured to the cutter spindle 35 of the gear cutting machine by screws 36 which connect the lower part 12 to the nose or face of the cutter spindle. The cutter spindle is rotated continuously in the cutting operation by means of a spur gear 37 which meshes with an internal gear 38 formed on the cutter spindle.

One of the lugs or blade supporting members 13 has secured to it a lug or tongue 40. This tongue 40 is engaged at either side by screws 41 and 42 which thread into lugs 43 and 44, respectively, formed integral with the nose or face of the cutter spindle 35. When the bolts 15 which secure the parts 11 and 12 of the cutter head together are unloosened, the part 11 can be adjusted on the part 12 through manipulation of the screws 41 and 42. This adjustment permits of spacing the blades 20 and 21 of each pair any desired distance apart for a purpose which will be more particularly hereinafter described. When the desired adjustment has been effected, the two parts 11 and 12 are secured together again by tightening up on the bolts 15.

Figure 3:
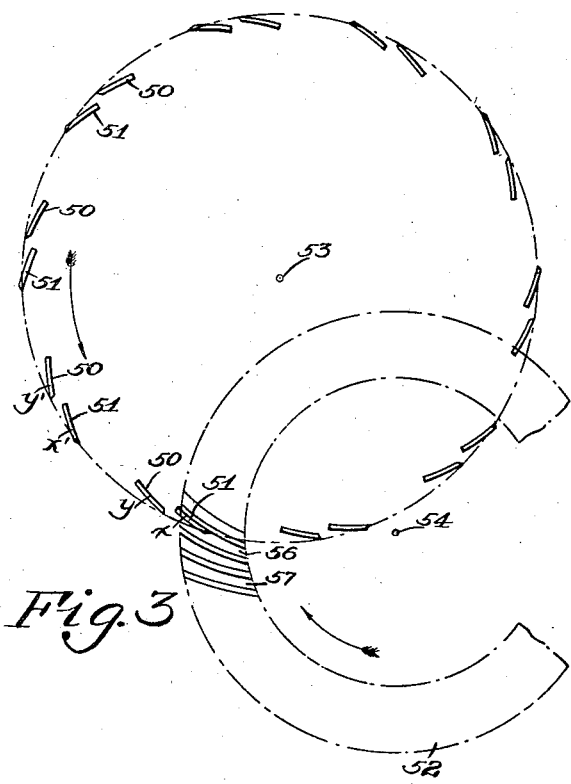
Figure 3 is a diagrammatic view illustrating the cutting relation of the tool and blank in the cutting of a longitudinally curved tooth tapered gear.

Assuming the desired radial and circumferential adjustment of the cutter blade to have been made, the cutter is used by rotating it continuously in engagement with the gear blank to be cut, the blank being at the same time rotated continuously on its axis in timed relation with the cutter. Figure 3 illustrates the use of the cutter. The outside cutting blades of the cutter head are designated at 50 and the inside cutting blades at 51. The tapered gear blank to be cut is shown in plan at 52. In operation, the cutter rotates continuously on its axis 53 and the blank 52 rotates on its axis 54 continuously in timed relation with the cutter rotation. As a result, each successive pair of blades 51—50 enters a different tooth space of the gear blank and all the teeth of the blank are cut simultaneously. Thus, the pair of blades designated $x$, $y$ may enter and cut on opposite side faces of the tooth space 56 of the gear blank and the next pair of blades designated $x'$, $y'$ enter the tooth space 57 and take cuts on opposite side faces thereof and so on with the remaining pairs of blades, each cutting in a different tooth space in one rotation of the cutter head.

Figure 5:
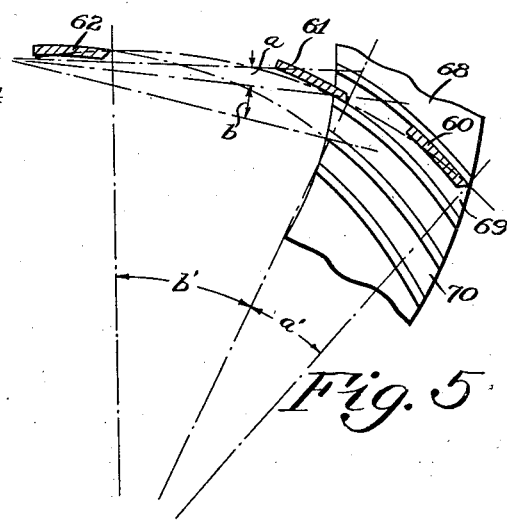
Figure 5 is a similar diagrammatic view showing the result obtained with the cutting blades adjusted to a different circumferential position.
Figure 6:
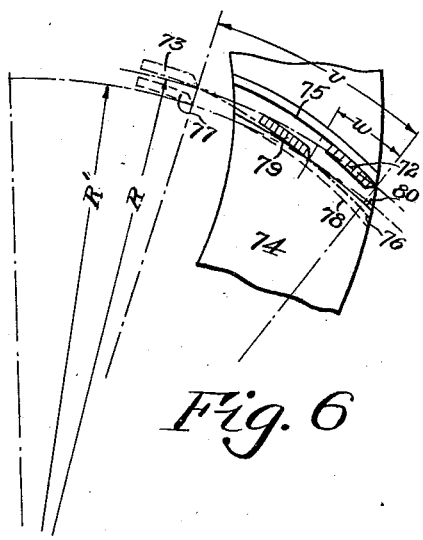
Figure 6 is a diagrammatic view showing how the lengthwise curvature of the teeth may be altered without affecting the tooth or tooth face width by adjustment of a cutter constructed according to the present invention.

The result attained by adjustment of one group of cutting blades circumferentially of the other, as is possible through adjustment of the part 11 of the cutter head on the part 12, is illustrated in Figures 4 and 5 while Figure 6 illustrates the possibilities present where the radial adjustment of the blades is combined with this circumferential adjustment. Referring first to Figure 4, as explained in Patent No. 1,249,378 where the cutting blades are arranged in pairs adapted to cut successively different tooth spaces of the blank, the distance between the cutting edges of each pair of blades is in the same ratio to the distance between the last cutting edge of the pair and the initial cutting edge of the next pair as the width of the base of a tooth space at one edge bears to the distance from the base of one tooth space to the base of the next adjacent tooth space. That is to say, referring to Figure 4, $a':b'=a:b$. Here, 60 designates an outside cutting blade and 61 the inside cutting blade of the pair, while 62 indicates the outside cutting blade of the following pair.

The blades 60 and 61 cut in the tooth space 63 of the blank 64 while the blade 62 will enter the tooth space 65 of the blank.

With the blades of each pair positioned apart a distance indicated at $a'$, the tooth space of the width shown at 63 or 65 will be cut. When the blades of the pairs are positioned farther apart, as shown in Figure 5, however, a larger tooth space will be cut. The blades are designated as before 60, 61 and 62. The two parts of the cutter head carrying the blades have been adjusted on each other, however, to set the blades 60 and 61 of each pair farther apart. 68 designates the blank, 69 the tooth space in which the blades 60 and 61 cut and 70 the space into which the succeeding pair, of which one blade is shown at 62, enters. The relation $a':b'=a:b$ will be maintained automatically, despite the adjustment effected, because of the construction of the cutter head. Thus, it will be clear that the same cutter can be used to cut gears having teeth of different width.

Where the longitudinal tooth curves of a pair of gears match each other exactly for the full length of mating tooth surfaces, the gears lack adjustment. They will not accommodate themselves to the variations in mountings and to the varying loads which occur in practice. It is customary, therefore, to cut a pair of longitudinally curved tooth gears so that the mating tooth surfaces will have a slightly different longitudinal curvature. In this way, the tooth surfaces will not bear on each other for their full length but will be said to have a localized bearing. When a proper localization of the bearing is secured, the gears will have enough adjustability to meet all the conditions of ordinary usage.

By changing the radial settings of the blades of a face mill hobbing cutter through adjustment of the wedges or use of different shims, or both, any desired lengthwise curvature can be produced on the teeth of the gear cut but if this adjustment alone is effected, the tooth space and tooth width of the gear will, also, be changed. Thus a gear cut with the blade set to one radius would not mesh with a gear cut with a blade whose radial setting alone had been changed. But if the circumferential positions of the outside and inside blades are adjusted relative to each other when the radial settings are changed, the desired tooth and tooth space width can be maintained and the gear will mesh properly with its mate. Thus, the present invention offers a very simple means of securing any desired localization of tooth bearing in a pair of mating gears. Figure 6 illustrates the process. For the purpose of clearness in illustration, the adjustment of the inside cutting blade only is shown.

72 and 73 indicate the positions of the blades when set to a radius R from the axis of the cutter head and when set apart circumferentially a distance V so as to cut tooth spaces and teeth on the gear 74 exactly matching the teeth and tooth spaces of the mating gear. In this position, the blades 72 and 73 will cut the sides of the tooth space designated by the lines 75 and 76. Now if one of the blades, as the blade 73 is adjusted radially to a new position 77 at a distance R' from the axis of the cutter, it will cut along a line 78 and a tooth space of too great width 75—78 will be obtained. The gear will not mesh correctly then with a mating gear cut with the blades in the radial position R. If, however, the inside blade is adjusted circumferentially relative to the outside blade from the position 77 to the position 79, in which it is at a circumferential distance W from the blade 72, by adjustment of one part of the cutter head on the other, a tooth space of proper width will be cut; one which is of the same width as the original tooth space 75—76 at the center of the face of the gear or at any desired point and the tooth side cut by the blade in its position 79 on a radius R' will have a different curvature from the curvature of the side of the tooth with the blade in the position 73 at the radial distance R. Thus the tooth surface cut by the blade in its position 79 will be of different curvature from the mating tooth surface of a mating gear and the two gears will run together with a localized bearing. The adjustment of only one of the blades has been illustrated for the sake of clearness, but it will be understood that the other blade can also be adjusted to secure a mis-match on the opposite sides of the teeth to localize the bearing between the opposite mating tooth surfaces of the mating gears. By reason of the mounting of the inside and outside blades on separate parts of the same cutter head, all of the inside blades are adjusted simultaneously about the axis of the cutter head relative to the outside blades.

With the present invention, either the outside or inside blades may be arranged to enter a tooth space first, as may be desired. The blades may be arranged, also, so that instead of cutting in a tooth space, the pair will cut opposite sides of a tooth and successive pairs will engage successively with different pairs of tooth sides.

While the invention has been described in connection with a particular embodiment and particular uses for that embodiment, it will be understood that it is capable of various further modifications, adaptations and uses and that this application is intended to cover any adaptations, uses, or embodiments of the invention, following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. A gear cutter comprising a rotatable head formed in two parts, a blade secured to one of said parts adapted to cut one side of the teeth of the gear blank and a blade secured to the other of said parts adapted to cut the opposite side of the gear teeth, each of said blades being formed and arranged on its respective part to cut successively on different tooth faces of the blank during rotation of the head, and said parts being adjustable relative to each other about the axis of the head to vary the angular distance between opposite side cutting blades whereby gears having teeth of different widths may be cut.

2. A gear cutter comprising a rotatable head made in two parts, a plurality of cutting blades secured to one of said parts formed to cut one side of the teeth of a gear blank, a plurality of cutting blades secured to the other of said parts formed to cut the opposite sides of the teeth of the blank, successive blades of each group being formed and arranged to cut successively on different tooth faces of the blank during rotation of the head and said parts being adjustable angularly relative to each other to vary the angular distance between opposite side cutting blades whereby gears having teeth of different widths may be cut.

3. A gear cutter comprising a rotatable head formed in two parts, one of which is adjustable relative to the other about the axis of the head, each of said parts being formed with a plurality of spaced peripheral blade supporting portions, the blade supporting portions of one part alternating with the blade supporting portions of the other part circumferentially around the cutter head, blades secured to the supporting portions of one part which are formed and arranged to cut successively on different tooth faces of a gear blank during rotation of the head and which are adapted to cut one side face of the teeth of the blank and blades secured to the supporting portion of the other part which are formed and arranged to cut successively on different tooth faces of a gear blank during rotation of the head and which are adapted to cut the other side face of the teeth of the blank, each of said blades having its cutting portions extending beyond the adjacent side face of its part in a direction generally parallel to the axis of the head.

4. A gear cutter comprising a rotatable head formed in two parts, a blade secured to one of said parts adapted to cut one side of the teeth of the gear and a blade secured to the other of said parts adapted to cut the opposite side of the teeth of the gear, each of said blades having its cutting portion extending beyond the adjacent side face of its part in a direction generally parallel to the axis of the cutter head and being formed and arranged on its respective part to cut successively different tooth faces of the blank during rotation of the head, said parts being adjustable relative to each other about the axis of the head to control the width of the gear teeth to be cut and each of said blades being adjustable on its part radially of the axis of the head to control the lengthwise curvature of the tooth surfaces to be cut.

5. A gear cutter comprising a rotatable head made in two parts, a plurality of cutting blades secured to one of said parts formed to cut one side of the teeth of a gear blank, a plurality of cutting blades secured to the other of said parts formed to cut the opposite sides of the teeth of the blank, successive blades of each group being formed and arranged to cut successively on different tooth faces of the blank during rotation of the head, said parts being adjustable angularly relative to each other to vary the angular distance between opposite side cutting blades to control the width of the gear teeth to be cut and each of said blades being adjustable on its part in a direction radial of the axis of the cutter head to control the lengthwise curvature of the tooth surfaces to be cut.

6. A gear cutter comprising a rotatable head made in two parts, a plurality of cutting blades secured to one of said parts formed to cut one side of the teeth of a gear blank, a plurality of cutting blades secured to the other of said parts formed to cut the opposite sides of the teeth of the blank, the blades of one part alternating with the blades of the other part around the cutter head, successive blades of each group being formed and arranged to cut successively on different tooth faces of the blank during rotation of the head, said parts being adjustable relative to each other about the axis of the head to vary the angular distance between opposite side cutting blades to control the width of the gear teeth to be cut, and each of said blades being adjustable on its part in a direction radial of the axis of the head to control the lengthwise curvature of the tooth surfaces to be cut.

7. A method of cutting longitudinally curved tooth gears which consists in employing a face mill cutter having a plurality of outside and inside cutting blades, adjusting the inside blades angularly relative to the outside cutting blades in accordance with the width of teeth desired to cut on the blank and rotating the cutter in engagement with the blank while rotating the blank continuously on its axis so that successive blades of the cutter cut successively on different tooth faces of the blank.

8. A method of cutting longitudinally curved tooth gears which comprises employing a face mill cutter having a plurality of outside and inside cutting blades, adjusting the blades radially of the axis of the cutter head to secure the desired lengthwise tooth curvature and then adjusting the inside cutting blades angularly relative to the outside cutting blades in accordance with the width of teeth desired to cut on the blank, and rotating the cutter in engagement with the blank while rotating the blank continuously on its axis so that successive blades of the cutter cut successively on different tooth faces of the blank.

9. The method of producing a desired mismatch of lengthwise curvature on the teeth of a pair of longitudinally curved tooth gears cut in a continuous indexing process with face mill cutters having a plurality of cutting blades adapted to cut successively on different tooth faces of a gear blank which consists in cutting one member of the pair with the blades for cutting opposite sides of the teeth adjusted to different radial and different circumferential positions from the position occupied by corresponding blades of the cutter employed in cutting the other member of the pair.

10. A gear cutter comprising a rotatable head and a plurality of cutting blades arranged thereon with their cutting portions projecting beyond the adjacent side face of the head in a direction generally parallel to the axis of the head, alternate blades being formed to cut opposite side tooth faces of a gear blank and each of the blades being arranged and adapted to cut successively different tooth faces of the blank during rotation of the cutter head, and the blades for cutting one side of the teeth being adjustable angularly relative to the blades for cutting the opposite side of the blank.

11. A gear cutter comprising a rotatable head and a plurality of cutting blades arranged thereon with their cutting portions projecting beyond the adjacent side face of the head in a direction generally parallel to the axis of the head, each of the blades being arranged and adapted to cut successively different tooth faces of a gear blank during rotation of the cutter head and alternate blades being formed to cut opposite tooth faces of a gear blank, the blades for cutting one side of the teeth being adjustable angularly relative to the blades for cutting the opposite sides of the teeth of the blank and each of the blades being adjustable radially of the axis of the head.

12. A gear cutter comprising a rotatable head and a plurality of cutting blades arranged thereon with their cutting portions projecting beyond the adjacent side face of the head in a direction generally parallel to the axis of the head, successive blades being arranged and adapted to cut successively different tooth faces of the blank during rotation of the cutter head and alternate blades being formed to cut opposite side tooth faces of the blank, the blades for cutting one side of the teeth being adjustable bodily about the axis of the cutter head with reference to the blades for cutting the opposite side faces of the teeth of the blank.

13. A gear cutter comprising a rotatable head and a plurality of cutting blades arranged thereon with their cutting portions projecting beyond the adjacent side face of the head in a direction generally parallel to the axis of the head, successive blades being arranged and adapted to cut successively different tooth faces of a gear blank during rotation of the head and alternate blades being formed to cut opposite side tooth faces of the blank, the blades for cutting one side of the teeth being adjustable about the axis of the head bodily with reference to the blades for cutting the opposite side of the teeth of the blank and each of the blades being adjustable radially of the axis of the head.

MAGNUS H. JOHANSON.